United States Patent [19]
Harris et al.

[11] Patent Number: 5,802,058
[45] Date of Patent: Sep. 1, 1998

[54] NETWORK-INDEPENDENT CONNECTION MANAGEMENT

[75] Inventors: Phillip E. Harris, Lafayette; Kurt H. Haserodt, Westminster, both of Colo.

[73] Assignee: Lucent Technologies Inc., Murray Hill, N.J.

[21] Appl. No.: 650,120

[22] Filed: Jun. 3, 1996

[51] Int. Cl.⁶ .................................................. H04J 3/12
[52] U.S. Cl. ........................ 370/410; 370/466; 370/522
[58] Field of Search ................................... 370/400, 401, 370/402, 410, 431, 466, 522, 252, 254, 255, 467

[56] References Cited

U.S. PATENT DOCUMENTS

| | | | |
|---|---|---|---|
| 4,631,534 | 12/1986 | Franklin et al. | 340/825.5 |
| 5,058,110 | 10/1991 | Beach et al. | 370/464 |
| 5,093,827 | 3/1992 | Franklin et al. | 370/354 |
| 5,375,167 | 12/1994 | Bales et al. | 379/207 |
| 5,471,318 | 11/1995 | Ahuja et al. | 358/400 |
| 5,623,488 | 4/1997 | Suennevik et al. | 370/401 |
| 5,640,446 | 6/1997 | Everett et al. | 370/401 |

OTHER PUBLICATIONS

IBM Application System/400 Technology Journal, Version 2 (S325–6020–00).
Application System/400 Communications: Advanced Program–to–Program Communications Programmer's Guide, Version 2 (SC41–8189–01).
Application System/400 Communications: Advanced Program–to–Program Communications Programmer's Guide, Version 2 (TNL SN41–0027–00, Base Publication SC41–8189–01).
U.S. Pat. application, F. J. Boyle 1–7–1–2–1, "Arrangement for Facilitating Plug–and–Play Call Features", Filed May 31, 1996.
U.S. Pat. application, S. R. Ahuja 7–2–3–1–1–1–7, Ser. No. 08/051724, "Multimedia Telecommunications Network and Service", Filed Apr. 22, 1993.

The AT&T MultiMedia Communications eXchange, Publication No. GBCS–MCS–097P1, 1996.
D. A. Berkley, et al., *Multimedia Research Platforms*, AT&T Technical Journal, Sep./Oct., vol. 74, No. 5, pp. 34–53.

(List continued on next page.)

*Primary Examiner*—Min Jung
*Attorney, Agent, or Firm*—David Volejnicek

[57] ABSTRACT

In a telecommunications system (8) that comprises communications endpoints (14–15), communications resources (18–20), a communications server (10) that includes a media manager (21), and a network (12) that interconnects them all, a first endpoint (14) provides the media manager with an offer of a connection to a second endpoint (15) that specifies attributes desired for the connection by the first endpoint. The media manager registers the request and forwards it to the second endpoint. When the second endpoint responds with an acceptance of the connection that specifies attributes desired for the connection by the second endpoint, the media manager compares the registered offer with the received acceptance to determine any resources that are needed to bridge any differences between their attributes and to effect the connection. The media manager then marshals any needed resources for the connection, sends a modified acceptance to any marshaled resource telling it the address of the second endpoint to connect to, sends a modified acceptance to the first endpoint that tells it the address of any marshaled resource, or of the second endpoint in the absence of any marshaled resource, to connect to, and leaves it up to the endpoints and marshaled resources to interact with the network to effect the connection through the network. The media manager can therefore provide centralized call control for substantially any network, and can treat all networks generically and leave it up to the endpoints to deal with the particulars of any specific network. Communications between multiple such telecommunications systems (8, 9) can also be effected thereby.

14 Claims, 4 Drawing Sheets

OTHER PUBLICATIONS

*Visual Telephone Systems and Equipment for Local Area Networks Which Provide a Non–Guaranteed Quality of Service*, ITU Telecommunication Standardization Sector, Document AVC–870R4, Draft H323, Jan. 30, 1996, pp. i–v, 1–72.

*COntrol Protocol for Multimedia Communication*, ITU Telecommunication Standardization Sector, Draft H.245, Nov. 9, 1995, pp. i–iv, 1–187.

*Interworking Between Networks, Mobile Data Transmission Systems, Internetwork Management*, ITU, CCITT, vol. VII-I–Fascicle VIII.6, ISBN 92–61–03711–9, IXth Plenary Assembly, Melbourne, 14–25 Nov. 1988, pp. 52 & 60.

R. Braden, et al., *Resource ReSerVation Protocol (RSVP)*, Version 1 Functional Specification, Internet Draft, Nov. 1995, pp. 1–97.

*Understanding TAO*, Computer Telephony, vol. 4, Iss. 2, Feb. 1996, pp. 141–162.

NETWORK-INDEPENDENT CONNECTION MANAGEMENT

TECHNICAL FIELD

This invention relates to telecommunications.

BACKGROUND OF THE INVENTION

The client-server architecture is becoming prevalent in transaction-processing systems, including telecommunications systems. In the client-server architecture, an endpoint computing device or software, called a "client", uses the resources that are controlled or managed by another computing device or software, called a "server", that is networked with the client by a network fabric (e.g., a local area network (LAN), a metropolitan area network (MAN), a wide area network (WAN), or even a conventional telephony switching network). The client requests and receives information, services, and/or use of physical resources, from the server.

Typically in telecommunications systems, call-control servers have direct control over the telecommunications network's connection-implementing (e.g., switching) fabric. When client endpoints make call requests to a call-control server, they specify their requirements to the server, and the server effects the requisite network connections through the network fabric. In order to do so, the call-control server must be tailored to the network fabric that it is controlling. Hence, different servers must be designed for different network fabrics. Moreover, most LANs, MANs, and WANs operate in a distributed fashion, wherein each entity that is connected to the network has substantially equal control over the network fabric as any other entity. Consequently, control of the network via a server (i.e., centralized control) is not only contrary to the design philosophy of the networks, but it is often also difficult to implement.

Attempts have been made to remove the connection-control function from a network central controller and distribute it among network endpoints. An illustrative example thereof is disclosed in U.S. Pat. No. 4,631,534. This patent discloses a distributed packet-switching system wherein a packet-switch controller acts as an address server for endpoint-station clients. When one (a calling) station wishes to communicate with another (a called) station, the network port of the calling station sends the calling and called station identifiers to the packet-switch controller. The controller translates the identifier of the called station into a packet-switching network address of the called station and sends the network address to the port of the calling station. The port of the calling station saves the network address and uses it to send packets to the called station through the packet-switching network.

An unfortunate limitation of arrangements such as this is that they require the calling and called endpoints to be directly interconnected by the network fabric, without intermediacy of any server, resource, gateway to another fabric, etc., that effectively functions as an intermediate endpoint. Consequently, such arrangements have severe limits as to the environments in which they may be used.

SUMMARY OF THE INVENTION

This invention is directed to solving these and other problems and disadvantages of the prior art. Illustratively according to the invention, in a client-server type of telecommunications system, the client endpoints make their requests and acceptances to the call-control server as before for communications connections having desired attributes, but rather than setting up the communications connections through the network, the server sends back instructions to the endpoints to enable them to themselves cause the network to effect the requisite connections. In addition, the server allocates and assigns (i.e., marshals) to the connection any communications resources that are needed to effect the connection through the network. Call connection management can thus be extended by a call-control server over substantially any kind of network, and the server can treat the network generically, like any other network. Yet, at the same time, call connection management can be centralized in the server, instead of having to be embedded in each network control element (e.g., endpoint, resource, or switch). Further advantages are that separate call-control servers can be connected together via substantially any underlying transport network and cooperate to form a network of call controllers; that telephony-like, large and feature rich, networks can be constructed as a transparent overlay over less-sophisticated networks such as the Internet; and that features can be developed which transparently inter-work between different types of networks.

Generally according to the invention, there is provided a communications-connection manager for a telecommunications system that includes a plurality of communications endpoints that are capable of setting up communications, a set of communications resources, and a communications medium that interconnects the endpoints and the resources. The manager effects connection management as follows. In response to receiving from a first endpoint an offer of a communication between the first and a second endpoint plus attributes of the communication desired by the first endpoint, the manager sends the offer to the second endpoint. In response to receiving from the second endpoint an acceptance of the offer plus attributes of the communication desired by the second endpoint, the manager determines any resource that is required to bridge any differences between the attributes of the offer and the attributes of the acceptance and to effect the communication. The manager then marshals any determined resource for the communication, and sends either to the first endpoint or to the second endpoint instructions for that endpoint to set up the communication between the endpoints on the medium through any marshaled resource. Illustratively, the manager sends to the first endpoint an acceptance of the offer that includes the instructions, and the instructions comprise either an address of a marshaled resource, or an address of the second endpoint in the absence of any marshaled resource. Illustratively, the manager also sends to the marshaled resource instructions for setting up the communication between the marshaled resource and the second endpoint, and the instructions comprise the address of the second endpoint. It is then up to the endpoint and any marshaled resource that receives the instructions to set up the communication on the medium between the first and second endpoints through any marshaled resource according to the received instructions.

Advantageously, the telecommunications system characterized above forms only one zone of a larger telecommunications system that includes a plurality of zones. Included among the resources of the one zone is at least one resource for interconnecting the medium with a second communications medium of a second zone that comprises at least one communications endpoint connected to the second medium and a second communications-connection manager for managing communications connections on the second medium, whereby a plurality of the zones and communications-connection managers can be networked to form an extended telecommunications system.

These and other advantages and features of the present invention will become more apparent from the following description of an illustrative embodiment of the invention taken together with the drawing.

DETAILED DESCRIPTION

Figure 1:
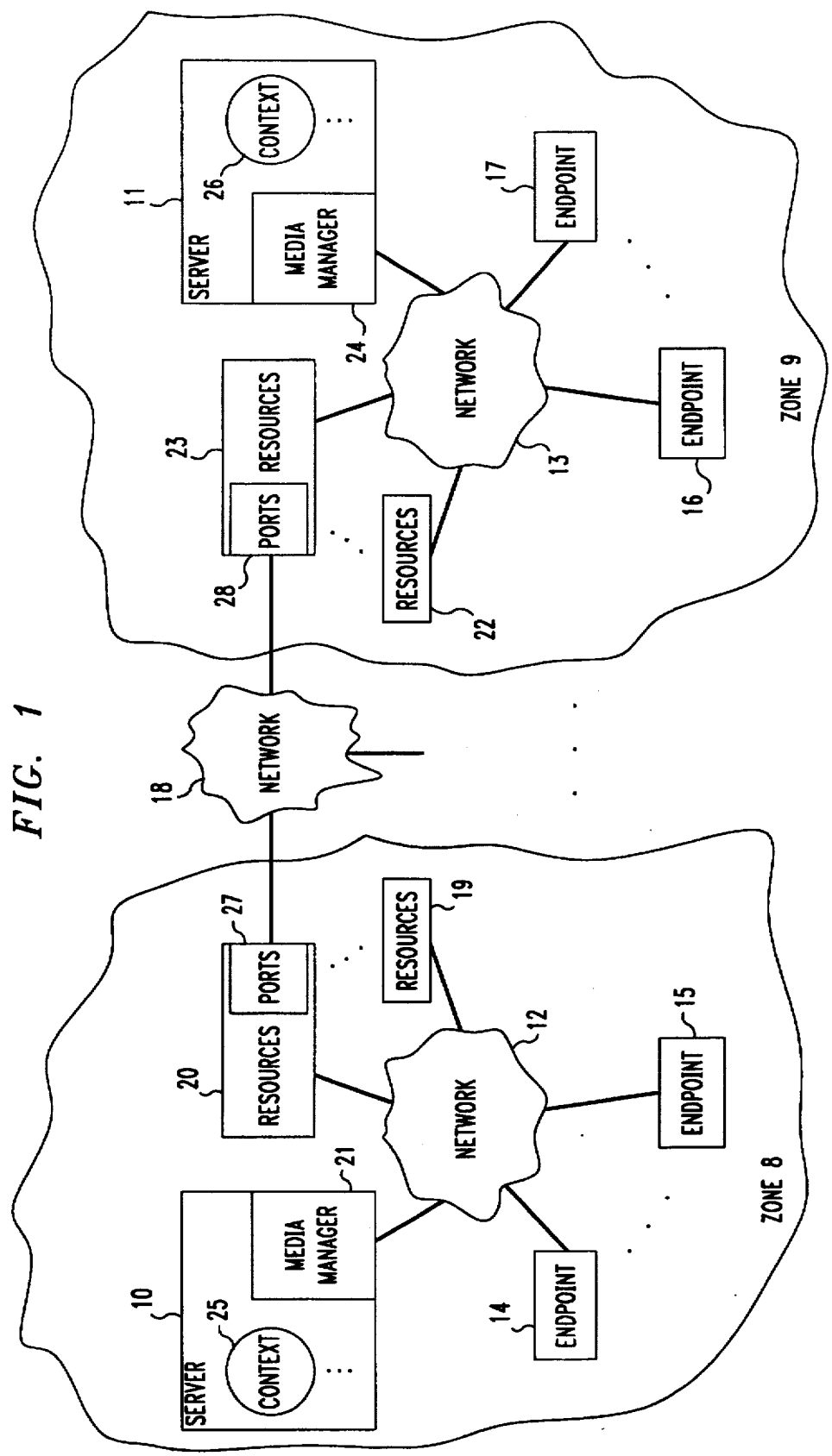
FIG. 1 is a block diagram of a telecommunications system that includes an illustrative embodiment of the invention.
Figure 2:
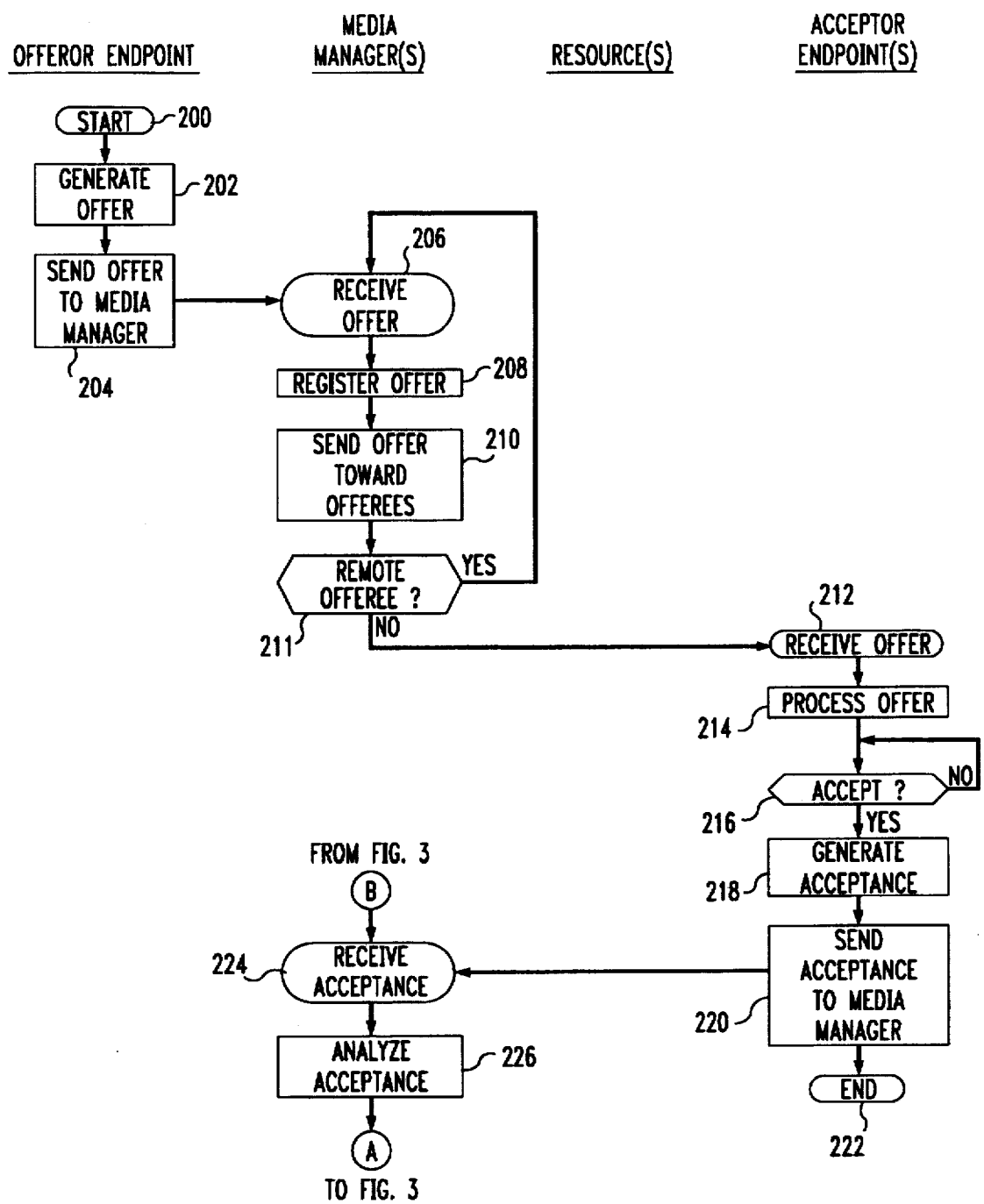
FIGS. 2–4 are a functional flow diagram of operations of endpoints and servers of the telecommunications system of FIG. 1 in implementing the illustrative embodiment of the invention.
Figure 3:
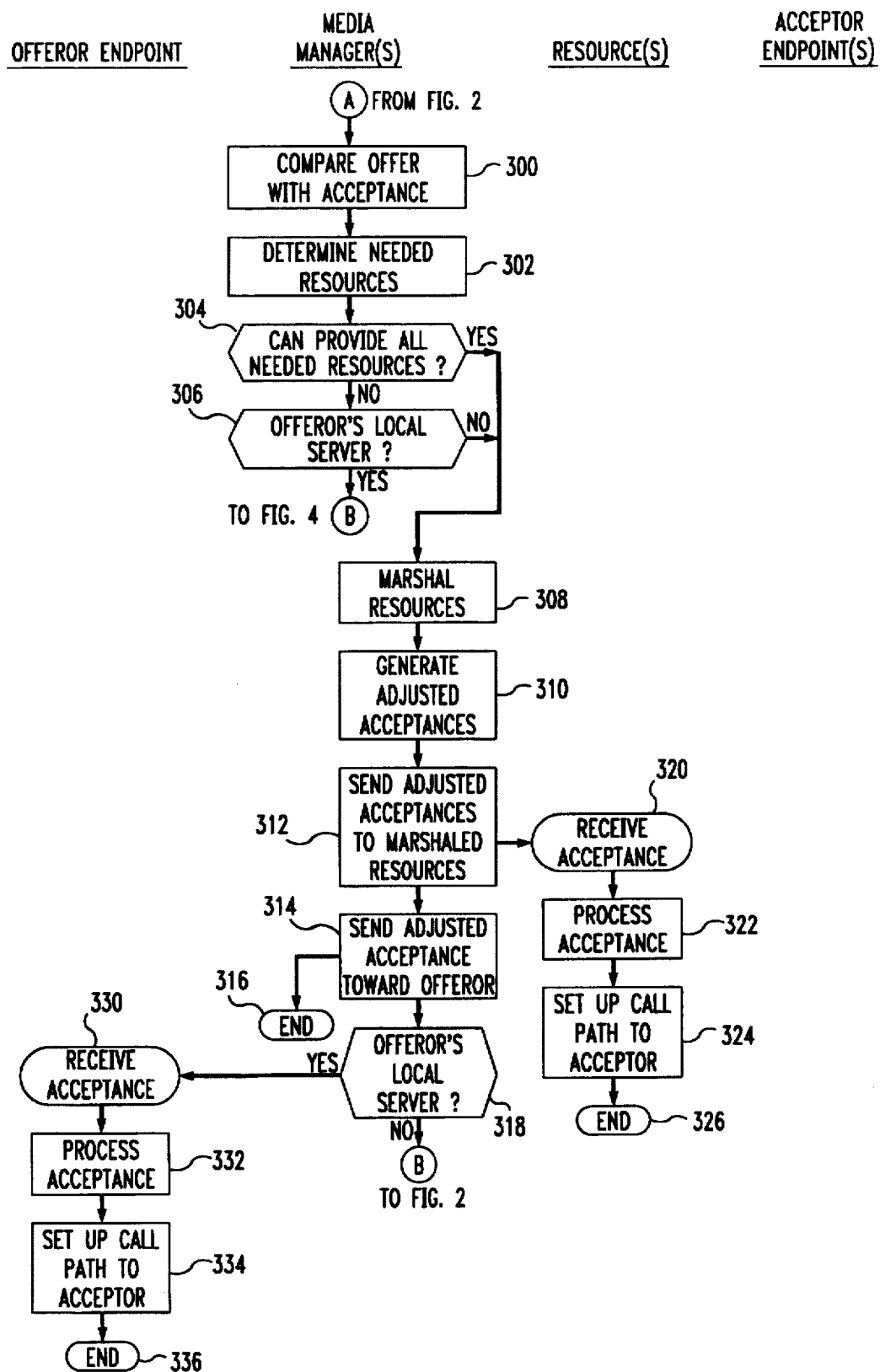

FIG. 1 shows a telecommunications system configured according to the invention. The system includes one or more communications sub-systems, or zones 8–9. Zone 8 includes a first communications network 12 that interconnects a plurality of first communications endpoints 14–15 with each other, with a first call-control server 10, and with first communications resources 19–20. Zone 9 includes a second communications network 13 that interconnects a plurality of second communications endpoints 16–17 with each other, with a second call-control server 11, and with second communications resources 22–23. The telecommunications system also includes a third network 18 that interconnects networks 12 and 13 to provide inter-zone communications between zones 8 and 9. While, for simplicity, only two zones 8–9 are shown as being interconnected by network 18, the system of FIG. 1 can comprise any number of interconnected zones. Ports 27 and 28 of resources 20 and 23, respectively, interface and interconnect networks 12 and 13, respectively, with network 18. Servers 10 and 11 provide communications services, such as media managers 21 and 24, respectively, for communications media (such as audio, video, distributed data, and shared data). Both endpoints 14–17 and servers 10–11 are stored-program-controlled devices that conventionally include interfaces to the external world, memory for storing control programs, and processors for executing the stored control programs and for controlling the interfaces. Illustratively, endpoints 14–17 are multimedia workstations, such as Sun or Hewlett-Packard workstations, networks 12–13 are LANs, MANs, WANs, or any other network-interconnect fabric, servers 10–11 are the Lucent Technologies MMCX multimedia communications exchanges, resources 19–20 and 22–23 are communications-resource and communications-function providers, such as protocol converters, conferencing circuits, gateways to other networks, etc., and network 18 is an inter-working transport medium, such as the Internet. Alternatively, network 18 is an equivalent of networks 12 and 13, with its own server (not shown) wherein resources 20 and 23 function as endpoints of network 18. Resources 20 and 23 are gateways from networks 12 and 13, respectively, to network 18 to which they connect through inter-network communications ports 27 and 28, respectively.

More detail about the illustrative implementation of servers 10 and 11 in the form of the Lucent Technologies MMCX exchange may be found in a patent application of F. J. Boyle III et al. entitled "Arrangement for Facilitating Plug-and-Play Call Features", Ser. No. 08/656,517, filed on May 31, 1996 (concurrently herewith), and assigned to the same assignee as this application, which is hereby incorporated herein by reference.

Illustratively, server 10 and either resources 19 or 20, or server 11 and either resources 22 or 23, may be co-located in a single programmable system.

In the case of each server 10–11 being an MMCX exchange, ports 27 and 28 are co-located with media managers 21 and 24 on servers 10 and 11, respectively. Media manager 21 and 24 of each server 10 and 11 knows about all active resources 19–20 and 22–23, respectively, on its network 12 and 13, respectively: each resource registers with its server's media manager when the resource becomes active. Each server 10–11 provides an infrastructure for bringing parties and multimedia services into communications "contexts" which provide bases for negotiation of service parameters. A context is a data representation of a "cyberspace meeting room". Each communications session (e.g., a multimedia call) is represented by its own context, a copy 25–26 of which exists in server 10–11 of each network 12–13 that is involved in the session. All communications take place within a context, and parties (users and their endpoints) and services (service managers, such as media managers 21 and 24) are joined to one another as members within the context by the servers. A remote network is represented in a context by a port 27, 28 that connects the session to the remote network. The context service is somewhat analogous to Microsoft corporation's Windows™ system. Just as the Windows system distributes events that reflect a change in the applications' presentation environment to all applications running in the environment, so does the context distribute events which reflect a change in the communications context to all members of the context. As part of the event-notification mechanism, context also supports negotiation among context members to enable interworking of endpoints and service managers with possibly-disparate capabilities.

According to the invention, network-independent connection management is implemented by endpoints 14–17, servers 10–11, and resources 19–20 and 22–23 in the system of FIG. 1 through an exchange of connection offers and acceptances. Each offer and each acceptance may include one or more separate messages. Each offer and acceptance includes addresses and attributes. In the case of an offer, the addresses include an identifier of the offeror (the originator of the offer) and an identifier of the offeree (the intended recipient of the offer). The identifier of the offeree may be an identifier of a context of which the offeror is a member. Alternatively, the offer may contain one or more identifiers of only certain members of the context as being the offerees. In the case of an acceptance, the addresses include an identifier of the offeror whose offer is being accepted and initially an identifier of the acceptor (the offer-accepting offeree). Offer and acceptance attributes may include some or all attributes of the proposed connection, such as the media type (e.g., audio, video, distributed data, shared data), class or quality of service, bandwidth, etc. (Some attributes may be assumed, and hence need not be conveyed.) The attributes may be conveyed by messages separate from the messages that convey the addresses, or attributes and addresses may be conveyed by the same messages. The exchange of offers and acceptances may be effected through substantially any desired communication protocol over networks 12 and 13, or even over a separate signaling network. One such suitable protocol is the transfer control protocol (TCP). Another suitable protocol is the RSVP protocol modified to extend the information carried by the protocol beyond bandwidth-allocation information to information needed for communication-attribute negotiation. A description of the RSVP protocol may be found in "Resource ReSerVation Protocol (RSVP)-Version 1 Functional Specification", an Internet-Draft of the Internet Engineering Task Force (IETF), dated Nov. 22, 1995.

After a party's endpoint has joined a context 25, it has the ability to make offers of communications connections to other party's endpoints. Offers of different-media connections are made on an as-needed basis, e.g., upon request from a party that is a context member to his or her endpoint. An offer is made by sending a message to a media manager of the local network's server. Upon being induced to make an offer, at step 200, an endpoint (let us assume endpoint 14) generates an offer message and populates its address and attribute fields with values that define who is to be connected (let us assume endpoint 14 with endpoints 15 and 16) and by what sort of a connection, at step 202. Endpoint 14 then sends the offer message to media manager 21 which is a member of context 25 that endpoint 14 is also a member of, in its local server 10, at step 204.

Upon receiving the offer message, at step 206, media manager 21 registers the offer for future use, at step 208, and then forwards the offer message to other entities that are involved in the communications session, that is, to other members of context 25 (let us assume endpoint 15 and port 27 on behalf of endpoint 16 of network 13), at step 210. If the offer is addressed to only certain context members, media manager 21 forwards the offer message to only the addressed members; if the offer is addressed to the communications session as a whole, media manager 21 forwards the offer message to all context members except the one from whom it had received the offer message.

If one or more of the context members to whom the offer message is to be forwarded is a remote offeree—one located in remote network 13—, as indicated at step 211, media manager 24 of server 11 receives the offer via network 18 and ports 27 and 28 and processes the offer in the same manner as did media manager 21 of server 10. That is, upon receiving the offer message, at step 206, media manager 24 registers the offer, at step 208, and then forwards the offeree message to other members of context 26 (endpoint 16) other than the one from whom it had received the offer message (port 28), at step 210.

Upon receiving the offer message, at step 212, each endpoint offeree (endpoints 15 and 16) processes the offer according to its own procedures and parameters, at step 214. This may involve notifying a user of endpoint 15 or 16 that the offer has been received. If and when processing of the offer results in acceptance of the offer (e.g., the user of the endpoint indicates acceptance) at the endpoint, as determined at step 216, the acceptor (i.e., the accepting offeree) 15, 16 generates an acceptance message and populates its address and attribute fields with values that define who the offeror and acceptor are and what sort of a connection the acceptor is willing to accept, at step 218. The attributes of the accepted connection may or may not be the same as the attributes of the offered connection. The acceptor 15, 16 then sends the acceptance message to media manager 21, 24 in its local server 10, 11, respectively, at step 220. The acceptor's involvement in the offer-acceptance procedure then ends, at step 222.

Figure 4:
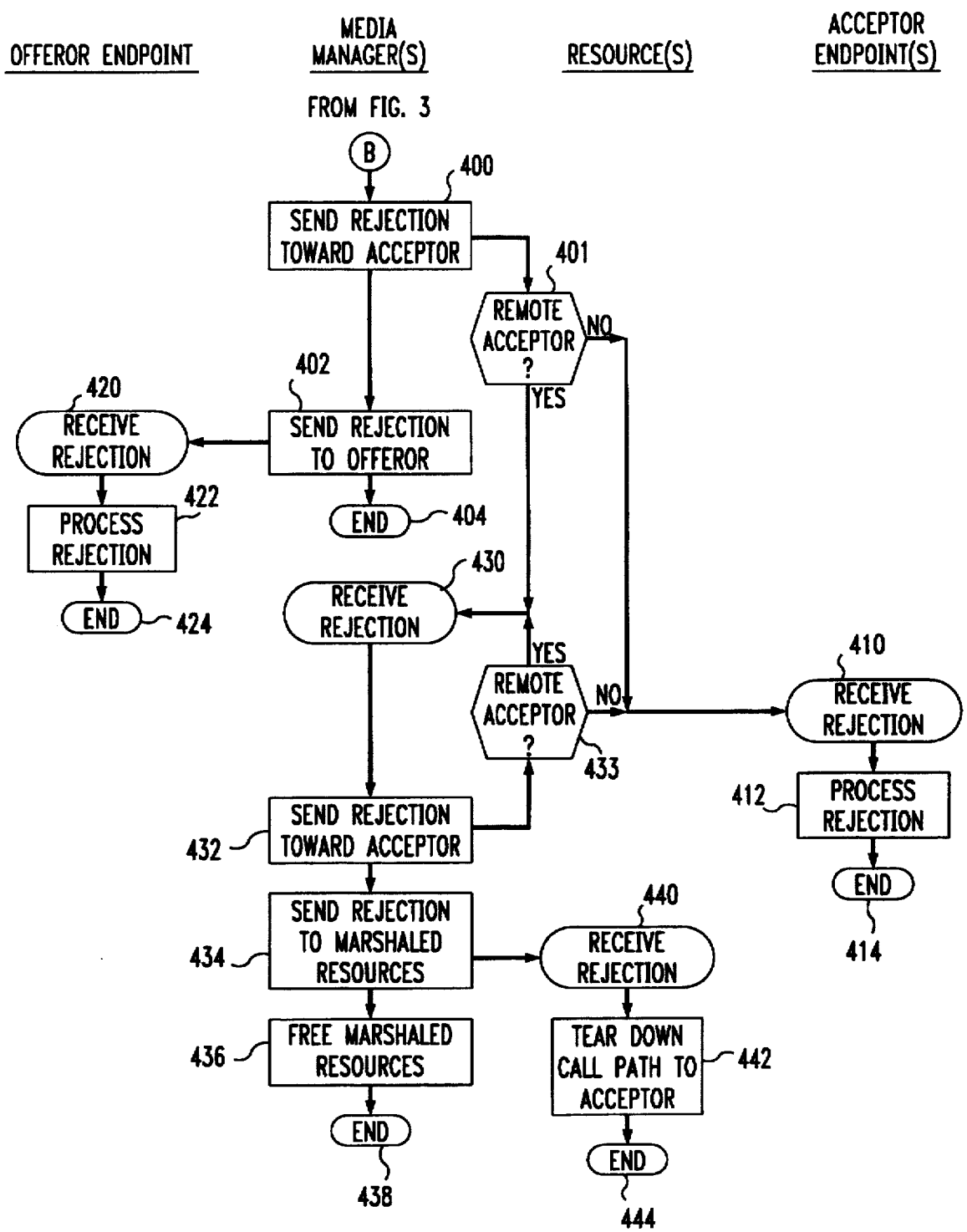

Upon receiving the acceptance message, at step 224, the media manager of the local server (media manager 21 of server 10 with respect to endpoint 15 and media manager 24 of server 11 with respect to endpoint 16), analyzes the offer, at step 226, to determine what services and resources of the local network 12, 13 the accepted connection requires, at step 302. Media manager 21, 24 also compares the acceptance with the original offer to discover whether there are any differences between the offer and the acceptance and what they are, at step 300, in order to determine what resources 19–20, 22–23 are needed to bridge any differences between the offer and the acceptance, at step 302. Media manager 21, 24 then determines, based on resources that are registered with that media manager 21, 24, whether it can provide all of the needed resources, at step 304. If not, media manager 21, 24 checks the offeror's address to determine whether it is in the offeror's local server, at step 306. If it determines that it is in the offeror's local server (i.e., server 10 in the assumed case of offeror 14), it proceeds to FIG. 4 to abort the planned connection.

If media manager 21, 24 either determines at step 304 that it can provide all needed resources, or if it determines at step 306 that it is not in the offeror's local server, media manager 21, 24 proceeds to step 308 to marshal the requisite resources, e.g., to allocate and assign them to the proposed connection. For example, if the connection must be made through another network, the media manager assigns the bandwidth that is required by the connection to the local port 27 or 28 that connects the local network to the remote network; if the offer specifies an A-law audio connection while the acceptance specifies a μ-law audio connection, the media manager assigns a protocol-converter from resources 19–20, 22–23 to the connection; and if the connection involves more than two entities on the media manager's network, the media manager assigns a conference bridge from resources 19–20, 22–23 to the connection. Media manager 21, 24 then generates a version of the received acceptance for each resource in its network that was marshaled at step 308, at step 310. For each resource, its version of the acceptance has an address of the entity that will be the recipient of the output of the resource as the acceptor address, and has the attributes that are required of the output of the resource as the attributes. Continuing the above example, when media manager 24 assigns a port 28 of the requisite bandwidth to the connection, media manager 24 changes the identifier of the acceptor to the assigned port 28; if media manager 21 or 24 assigns an A-law/μ-law protocol converter to the connection, then media manager 21 or 24 changes the identifier of the acceptor to the assigned protocol converter of resources 19–20 or 22–23, respectively, and changes the acceptance attributes from μ-law to A-law; and when media manager 21 assigns a conference bridge to the connection, it changes the identifier of the acceptor to the assigned conference bridge of resources 19–20. Media manager 21, 24 then sends the adjusted acceptances to the marshaled resources, at step 312.

Upon receipt of the adjusted acceptance, at step 320, each receiving resource processes the acceptance, at step 322, using the attributes of the acceptance to set itself up so as to provide the requisite output. Each receiving resource also uses the acceptor address in its received acceptance to set up a call path to that address, at step 324.

Following step 312, media manager 21, 24 also sends an adjusted acceptance toward the offeror, at step 314. Its involvement in the offer-acceptance procedure then ends, at step 316. As indicated at step 318, media manager 21 of the offeror's local server 10 sends the adjusted acceptance to offeror endpoint 14, while media manager 24 of a remote server 11 sends the adjusted acceptance to the port 28 that connects the subject communications session through network 18 to network 12. The port 27 that receives the acceptance from port 28 passes it on to media manager 21 of server 10, which responds as shown and described at steps 224 et seq.

Upon receiving the acceptance from media manager 21, at step 330, offeror endpoint 14 processes the acceptance, at step 332, to ready itself for the proposed connection. Endpoint 14 then interacts with the local network 12, in whatever manner is dictated by the network 12, to cause network 12 to set up a connection between endpoint 14 and whatever entity (e.g., endpoint 15, resource 19, or a port 27) is identified as the acceptor in the acceptance, at step 334. Involvement of endpoint 14 in the offer-acceptance procedure then ends, at step 336. Returning to step 306, if media manager 21 determines that it is in the local server of the offeror and cannot provide all resources needed by the proposed connection, the proposed connection cannot be effected, and media manager 21 proceeds to FIG. 4 to abort it. Media manager 21 sends a rejection toward the acceptor that is identified in the message, at step 400, and also to the offeror—endpoint 14—at step 402. Its involvement in the offer-acceptance procedure then ends, at step 404.

In response to receiving the rejection, at step 420, offeror endpoint 14 processes the rejection, at step 422 (e.g., it notifies its user that the desired connection cannot be made), and ends the offer-acceptance procedure, at step 424.

If the acceptor is local, e.g., endpoint 15, as indicated at step 401, it receives the rejection directly from media manager 21, at step 410. If the acceptor is remote, first the media manager 24 of remote server 11 receives the rejection from media manager 21 of local server 10 through port 28, at step 430. In response, media manager 24 sends the rejection toward the acceptor, at step 432. If the acceptor is local—endpoint 16 in this example—as indicated at step 433, it receives the rejection directly, at step 410. If the acceptor were remote, it would receive the rejection indirectly, through its own media manager, at steps 430 et seq. Upon receipt of the rejection, at step 410, the acceptor processes the rejection, at step 412, and then ends its involvement in the proposed connection, at step 414.

Further in response to receipt of the rejection, media manager 24 of remote server 11 sends the rejection to the resources that it had marshaled at step 308, at step 434, frees the marshaled resources from assignment to the subject connection for use by other connections, at step 436, and then ends its involvement in the offer-acceptance process, at step 438. Upon receipt of the rejection, at step 440, each resource tears down the call-path segment that it had setup at step 324, at step 442, and ends its involvement in the proposed connection, at step 444.

Of course, various changes and modifications to the illustrative embodiment described above will be apparent to those skilled in the art. For example, instead of the acceptance including the address to which the offeror must attach, the offer may include the address to which the acceptor must attach, whereby the call path is formed in the reverse direction from the one disclosed above. Or, offer attributes and acceptance attributes may be communicated to the servers in messages that are separate from the messages that convey the addresses along the call path, and the attribute messages need not follow the call path—they may be communicated to the servers via a separate signaling network, for example. Also, instead of using the context of the MMCX exchange as the messaging mechanism for offers and acceptances, any other desired messaging mechanism may be used. One suitable alternative mechanism is the multipoint communications services (MCS) protocol which is described in the ITU T.120 protocol series. Such changes and modifications can be made without departing from the spirit and the scope of the invention and without diminishing its attendant advantages. It is therefore intended that such changes and modifications be covered by the following claims.

The invention claimed is:

1. A telecommunications system comprising:

a plurality of communications endpoints;

a communications-connection manager;

a set of communications resources;

a communications medium interconnecting the endpoints and the resources;

means in a first endpoint for sending to the manager an offer of a communication between the first and a second endpoint and attributes of the communication desired by the first endpoint;

means in the manager responsive to receipt of the offer, for sending the offer to the second endpoint;

means in the second endpoint responsive to receipt of the offer for sending to the manager an acceptance of the offer and attributes of the communication desired by the second endpoint;

means in the manager responsive to the received offer and to receipt of the acceptance, for determining any resource that is required to bridge any differences between the attributes of the offer and of the acceptance and to effect the communication;

means in the manager responsive to the determination, for marshaling any determined resource for the communication;

means in the manager responsive to the marshaling, for sending to one of the first endpoint and the second endpoint instructions for the one endpoint to set up the communication between the one endpoint and another of the first endpoint and the second endpoint through any marshaled resource; and means in the one endpoint responsive to receipt of the instructions sent by the manager, for setting up the communication between the first and second endpoints through any marshaled resource on the medium according to the received instructions.

2. The system of claim 1 wherein:

the means for sending instructions comprise means in the manager responsive to the marshaling, for sending to the first endpoint an acceptance of the offer including instructions for the first endpoint to set up the communication through any marshaled resource.

3. The system of claim 1 wherein:

the resources have addresses on the communications medium; and the means for sending instructions comprise means in the manager responsive to the marshaling, for sending to the one endpoint instructions for the one endpoint to set up the communication to the other endpoint through the address of any marshaled resource.

4. The system of claim 1 wherein:

the endpoints and the resources have addresses on the communications medium; and the means for sending instructions comprise means in the manager responsive to the marshaling, for sending to the one endpoint the address of at least one of (a) a marshaled resource and (b) the other endpoint.

5. The system of claim 1 wherein:

the means for sending instructions comprise means in the manager responsive to marshaling of at least one resource for the communication, for sending to the marshaled resource an acceptance of the offer including instructions for the marshaled resource to set up a communication between the marshaled resource and the second endpoint, and for sending to the first endpoint an acceptance of the offer including instructions for the first endpoint to set up a communication between the first endpoint and the marshaled resource, and further responsive to marshaling of no resource for the communication, for sending to the first endpoint an acceptance of the offer including instructions for the first endpoint to set up a communication directly between the first endpoint and the second endpoint; and the system further comprising means in the at least one marshaled resource responsive to receipt of the acceptance of the offer including the instructions for the marshaled resource, for setting up the communication between the marshaled resource and the second endpoint according to the received instructions.

6. A communications-connection manager for a telecommunications system that includes a plurality of communications endpoints that are capable of setting up communications according to received instructions, a set of communications resources, and a communications medium interconnecting the endpoints and the resources, comprising:

means responsive to receipt from a first endpoint of an offer of a communication between the first and a second endpoint and attributes of the communication desired by the first endpoint, for sending the offer to the second endpoint;

means responsive to receipt from the second endpoint of an acceptance of the offer of the communication and attributes of the communication desired by the second endpoint, for determining any resource that is required to bridge any differences between the attributes of the offer and the attributes of the acceptance and to effect the communication;

means responsive to the determination, for marshaling any determined resource for the communication; and means responsive to the marshaling, for sending to one of the first endpoint and the second endpoint instructions for the one endpoint to set up the communication between the one endpoint and another of the first endpoint and the second endpoint on the medium through any marshaled resource.

7. The manager of claim 6 wherein:

the means for sending instructions comprise means in the manager responsive to the marshaling, for sending to the first endpoint an acceptance of the offer including instructions for the first endpoint to set up the communication through any marshaled resource.

8. The manager of claim 6 for a telecommunications system wherein the resources have addresses on the communications medium, wherein:

the means for sending instructions comprise means in the manager responsive to the marshaling, for sending to the one endpoint instructions for the one endpoint to set up the communication to the other endpoint through the address of any marshaled resource.

9. The manager of claim 6 for a telecommunications system wherein the endpoints and the resources have addresses on the communications medium, wherein:

the means for sending instructions comprise means in the manager responsive to the marshaling, for sending to the one endpoint the address of at least one of (a) a marshaled resource and (b) the other endpoint.

10. The manager of claim 6 for a telecommunications system wherein the resources are capable of setting up communications according to received instructions, wherein:

the means for sending instructions comprise means in the manager responsive to marshaling of at least one resource for the communication, for sending to the marshaled resource an acceptance of the offer including instructions for the marshaled resource to set up a communication between the marshaled resource and the second endpoint, and for sending to the first endpoint an acceptance of the offer including instructions for the first endpoint to set up a communication between the first endpoint and the marshaled resource, and further responsive to marshaling of no resource for the communication, for sending to the first endpoint an acceptance of the offer including instructions for the first endpoint to set up a communication directly between the first endpoint and the second endpoint.

11. The manager of claim 6 for a telecommunications system that includes among the resources at least one means for interconnecting the medium with a second communications medium of a second communications system that comprises at least one communications endpoint connected to the second medium and a second communications-connection manager for managing communications connections on the second medium.

12. A method of managing communications connections in a telecommunications system that includes a plurality of communications endpoints, a set of communications resources, a communications medium interconnecting the endpoints and the resources, and a communications-connection manager, the method comprising the steps of:

sending an offer of a communication between a first and a second endpoint and attributes of the communication desired by the first endpoint from the first endpoint to the manager;

in response to receipt of the offer by the manager, sending the offer from the manager to the second endpoint;

in response to receipt of the offer by the second endpoint, sending an acceptance of the offer and attributes of the communication desired by the second endpoint from the second endpoint to the manager;

in response to receipt of the acceptance by the manager, determining at the manager any resource that is required to bridge any differences between the attributes of the offer and the attributes of the acceptance and to effect the communication;

in response to the determination, marshaling any determined resource for the communication by the manager;

in response to the marshaling, sending instructions for one of the first endpoint and the second endpoint to set up the communication between the one endpoint and another of the first endpoint and the second endpoint through any marshaled resources from the manager to the one endpoint; and in response to receipt of the instructions by the one endpoint, the one endpoint setting up the communication between the first and second endpoints through any marshaled resource on the medium according to the received instructions.

13. A telecommunications system comprising:
- a first communications endpoint;
- a first communications-connection manager;
- a set of first communications resources;
- a first communications medium interconnecting the first endpoint and the first resources;
- a second communications endpoint;
- a second communications-connection manager;
- a set of second communications resources;
- a second communications medium interconnecting the second endpoint and the second resources;
- means for interconnecting the first medium with the second medium;
- means in the first endpoint for sending to the first manager an offer of a communication between the first and the second endpoints and attributes of the communication desired by the first endpoint;
- means in the first manager responsive to receipt of the offer, for sending the offer to the second manager;
- means in the second manager responsive to receipt of the offer, for sending the offer to the second endpoint;
- means in the second endpoint responsive to receipt of the offer, for sending to the second manager an acceptance of the offer and attributes of the communication desired by the second endpoint;
- means in the second manager responsive to the received offer and to receipt of the acceptance, for determining any second resource that is required to bridge any differences between the attributes of the offer and the attributes of the acceptance and to effect the communication;
- means in the second manager responsive to the determination, for marshaling any determined second resource for the communication;
- means in the second manager responsive to the marshaling, for sending to one of the interconnecting means and the second endpoint first instructions for the one of the interconnecting means and the second endpoint to set up the communication between the one of the interconnecting means and the second endpoint on the second medium through any marshaled second resource;
- the one of the interconnecting means and the second endpoint being responsive to receipt of the first instructions for setting up the communication on the second medium according to the first instructions;
- means in the second manager responsive to the marshaling, for sending to the first manager an acceptance of the offer and the attributes of the acceptance modified for those attributes bridged by any second resource marshaled by the second manager;
- means in the first manager responsive to the received offer and to receipt of the acceptance, for determining any first resource that is required to bridge any differences between the attributes of the offer and the modified attributes of the acceptance and to effect the communication;
- means in the first manager responsive to the determination, for marshaling any determined first resource for the communication;
- means in the first manager responsive to the marshaling, for sending to one of the interconnecting means and the first endpoint second instructions for the one of the interconnecting means and the first endpoint to set up the communication between the one of the first endpoint and the interconnecting means on the first medium through any marshaled first resource; and
- the one of the interconnecting means and the first endpoint being responsive to receipt of the second instructions, for setting up the communication on the first medium according to the second instructions.

14. A method of managing communications connections in a telecommunications system that includes a first communications endpoint, a set of first communications resources, a first communications medium interconnecting the first endpoint and the first resources, a first communications-connection manager for the first medium, a second communications endpoint, a set of second communications resources, a second communications medium interconnecting the second endpoint and the second resources, a second communications-connection manager for the second medium, and means for interconnecting the first medium with the second medium, the method comprising the steps of:

- sending an offer of a communication between the first and the second endpoints and attributes of the communication desired by the first endpoint from the first endpoint to the first manager;
- in response to receipt of the offer by the first manager, sending the offer from the first manager to the second manager;
- in response to receipt of the offer by the second manager, sending the offer from the second manager to the second endpoint;
- in response to receipt of the offer by the second endpoint, sending an acceptance of the offer and attributes of the communication that are desired by the second endpoint from the second endpoint to the second manager;
- in response to receipt of the offer and the acceptance by the second manager, determining at the second manager any second resource that is required to bridge any differences between the attributes of the offer and the attributes of the acceptance and to effect the communication;
- in response to the determination, marshaling any determined second resource for the communication by the second manager;
- in response to the marshaling, sending first instructions for one of the interconnecting means and the second endpoint to set up the communication between the one of the interconnecting means and the second endpoint on the second medium through any marshaled second resource from the second manager to the one of the interconnecting-means and the second endpoint;
- in response to receipt of the first instructions by the one of the interconnecting means and the second endpoint, setting up the communication on the second medium according to the first instructions by the one of the interconnecting means and the second endpoint;
- in response to the marshaling, sending an acceptance of the offer and the attributes of the acceptance modified for those attributes bridged by any second resource marshaled by the second manager from the second manager to the first manager;
- in response to receipt of the offer and of the acceptance by the first manager, determining any first resource that is required to bridge any differences between the attributes of the offer and the modified attributes of the acceptance and to effect the communication at the first manager;

in response to the determination, marshaling any determined first resource for the communication by the first manager;

in response to the marshaling, sending second instructions for one of the interconnecting means and the first endpoint to set up the communication between the one of the first endpoint and the interconnecting means on the first medium through any marshaled first resource from the first manager to the one of the interconnecting means and the first endpoint; and in response to receipt of the second instructions at the one of the interconnecting means and the first endpoint, setting up the communication on the first medium according to the second instructions by the one of the interconnecting means and the first endpoint.

* * * * *